United States Patent
Feick et al.

(10) Patent No.: US 12,168,484 B2
(45) Date of Patent: Dec. 17, 2024

(54) RAILBORNE DRIVER ASSISTANCE DEVICE AND METHOD FOR SUPPORTING OR AUTOMATING THE LATERAL CONTROL OF A VEHICLE

(71) Applicant: Continental Automotive GmbH, Hannover (DE)

(72) Inventors: Stefan Feick, Bad Soden (DE); Philipp Keßler, Nierstein (DE); Michael Simon, Frankfurt am Main (DE)

(73) Assignee: Continental Automotive GmbH, Hannover (DE)

( * ) Notice: Subject to any disclaimer, the term of this patent is extended or adjusted under 35 U.S.C. 154(b) by 163 days.

(21) Appl. No.: 17/597,685

(22) PCT Filed: Jun. 3, 2020

(86) PCT No.: PCT/DE2020/200041
§ 371 (c)(1),
(2) Date: Jan. 18, 2022

(87) PCT Pub. No.: WO2021/008661
PCT Pub. Date: Jan. 21, 2021

(65) Prior Publication Data
US 2022/0281518 A1    Sep. 8, 2022

(30) Foreign Application Priority Data

Jul. 16, 2019   (DE) .................. 10 2019 210 509.2

(51) Int. Cl.
*B62D 5/04*    (2006.01)
*B62D 6/04*    (2006.01)
*B62D 15/02*   (2006.01)

(52) U.S. Cl.
CPC ......... *B62D 5/0463* (2013.01); *B62D 15/025* (2013.01); *B62D 6/04* (2013.01)

(58) Field of Classification Search
CPC ....... B62D 5/0463; B62D 15/025; B62D 6/04
See application file for complete search history.

(56) References Cited

U.S. PATENT DOCUMENTS

| | | | |
|---|---|---|---|
| 2010/0138112 A1 | 6/2010 | Suzuki et al. | |
| 2013/0261896 A1 | 10/2013 | Gebregergis | |
| 2016/0121925 A1* | 5/2016 | Lazic ................... | B62D 15/025 701/41 |

FOREIGN PATENT DOCUMENTS

| | | |
|---|---|---|
| CN | 105383556 A | 3/2016 |
| DE | 102008033687 A1 | 1/2010 |

(Continued)

OTHER PUBLICATIONS

German Search Report dated Feb. 3, 2020 for the counterpart German Application No. 10 2019 210 509.2.

(Continued)

*Primary Examiner* — Rodney A Butler

(57) ABSTRACT

A railborne driver assistance device for supporting or automating the lateral control of a vehicle includes a first processing unit configured to control a steering torque intervention by establishing a steering angle with a stationary control accuracy of an electrically supported steering system. A second processing unit is configured to adjust the stationary control accuracy of the steering angle via the output of an accuracy request signal to the first processing unit in such a way that there is a scaling of the control accuracy between a lower and an upper threshold value. The second processing unit includes a control unit having an integrator with an input and an output, wherein the output of the integrator is connected to the input in a closed-loop manner with a weighting dependent on the accuracy request signal.

15 Claims, 4 Drawing Sheets

(56) References Cited

FOREIGN PATENT DOCUMENTS

| | | |
|---|---|---|
| DE | 102014208785 A1 | 11/2015 |
| EP | 3321149 A1 | 5/2018 |
| JP | H10297521 A | 11/1998 |
| JP | 2002120744 A | 4/2002 |
| JP | 2009051491 A | 3/2009 |
| JP | 2013216202 A | 10/2013 |
| JP | 2015020604 A | 2/2015 |
| JP | 2018012390 A | 1/2018 |

OTHER PUBLICATIONS

The International Search Report and the Written Opinion of the International Searching Authority mailed on Sep. 30, 2020 for the counterpart PCT Application No. PCT/DE2020/200041.
Notice of Reasons for Refusal dated Jan. 11, 1023 for the counterpart Japanese Patent Application No. 2021-575495 and Translation.
German Office Action dated Jan. 31, 2023 for the counterpart German Patent Application No. 11 2020 003 389.9 and Translation.
Chinese First Office Action dated May 26, 2023 for the counterpart Chinese Patent Application No. 202080050180.8 and Translation.
Korean Office Action dated Nov. 10, 2023 for the counterpart Korean Patent Application No. 10-2021-7042540.

* cited by examiner

RAILBORNE DRIVER ASSISTANCE DEVICE AND METHOD FOR SUPPORTING OR AUTOMATING THE LATERAL CONTROL OF A VEHICLE

TECHNICAL FIELD

The technical field relates to a railborne driver assistance device as well as a method for supporting or automating the lateral control of a vehicle.

BACKGROUND

Railborne driver assistance systems utilize detected surroundings and road data in order to control vehicles laterally and longitudinally along a selected course. In most cases, the electric power steering (EPS), which receives suitable control signals from the control unit of the driver assistance system, is used as the actuator for lateral vehicle guidance.

On the one hand, additive superposition torques on the engine torque of the EPS engine have proven to be appropriate specification signals for influencing the position of the articulated wheels and, therefore, the vehicle's lateral position. This makes it possible to achieve a high level of steering comfort and steering wheel smoothness since the EPS engine torque delivered is directly related to the steering torque felt by the driver and the actuator acceleration. The disadvantage of engine torque interfaces, however, is often the high signal latency as a result of the communication via the vehicle bus, which places limits on the control dynamics.

In order to avoid the disadvantage of this latency, it is common practice to use subordinate steering angle controllers which are realized during a fast calculation task on the EPS. The characteristics of this steering angle control have a decisive influence on comfort-determining parameters of the railborne assistance system. On the one hand, this relates to the activity of the steering wheel perceptible to the driver when driving straight ahead, during which steady, fluid steering wheel movements of low amplitude are expected.

On the other hand, when the driver is steering with or against the driver assistance system, the steering feel should be comfortable in the sense that the driver should feel the steering torque in a way he can comprehend. In this case, the driver expects steering torques which increase linearly to the greatest possible extent with the amount of deflection of the steering wheel in the sense of the characteristics of a mechanical spring. By contrast, the driver does not expect the steering torque to increase continually, for instance, when the steering wheel is constantly deflected.

For reasons of limited resources on the EPS, many EPS steering angle controllers available on the market are based on simple PI(D) controller structures or controllers with disturbance variable compensators which, when viewed in isolation, do indeed provide adequate reference variable control but, in combination with a driver assistance system, demonstrate the comfort disadvantages mentioned above, namely twitchy steering wheel behavior and a steering feeling that is only partially comprehensible when the driver oversteers.

The reason for the twitchy steering wheel behavior of controlled steering actuators lies in the interaction of the controller integral components with the static and dynamic friction of the steering systems. As a result, limit cycles of the steering angle are formed, the amplitude and frequency of which are dependent on the controller adjustment and the degree of friction.

The reason for the uncomfortable oversteering is the fact that the driver's intervention is interpreted as a disturbance by the steering angle control and is increasingly corrected by the controller integral component or the load compensators until the target angle and actual angle (within the framework of the available actuating torque) are in harmony again. The controller integral components or the load compensators are not charged up suddenly, but within a given period of time depending on the controller design. During this continual integration, the driver feels an increasing counter-torque even at constant steering wheel deflection, which is uncomfortable and implausible or incomprehensible.

In the case of the EPS controller design, striving for a high level of comfort while at the same time making great demands on the control dynamics, disturbance variable correction and control accuracy represents a conflict of objectives that can only be decided in favor of one criterion when using rudimentary control structures.

As such, it is desirable to reduce or eliminate the described comfort disadvantages of the interaction of an ADAS control unit with an EPS steering angle control, in other words twitchy steering wheel behavior and implausible oversteering torque, without simultaneously restricting the system performance of the railborne vehicle guidance system, in particular the lane keeping accuracy and the behavior on entering and exiting curves. Poor lane keeping accuracy would be expressed, for example, by a stationary or dynamic lateral offset error when driving straight ahead or cornering.

It is also desirable to carry out as few interventions as possible in the EPS system, of being able to use universal steering angle controller types, of keeping the application and test effort on the EPS low and of minimizing the necessary signal flow between the EPS and the driver assistance system.

SUMMARY

The solution to the problem consists in particular of extending a steering angle controller on an electric power steering device of a vehicle to include a small amount of functionality and extending an interface with the electric power steering device to include an interface signal, with the aid of which a stationary control accuracy of the electric power steering device can be attenuated in an adaptive manner, depending on the specification, by a processing unit, in particular by a control unit of the driver assistance device.

Consequently, a railborne driver assistance device for supporting or automating the lateral control of a vehicle is proposed. A railborne driver assistance device is to be understood to be, for example, a Lane Keeping Assist, Lane Departure Protection and/or a lane assistant for performing a lane change.

The railborne driver assistance device includes a first processing unit which is designed to control a steering torque intervention by establishing a steering angle with a stationary control accuracy of an electrically supported steering system. The first processing unit is, for example, a central control unit of the vehicle. The first processing unit is particularly preferably an EPS control unit. Consequently, the first processing unit is located for example on an EPS (Electronic Power Steering). Stationary control accuracy is to be understood in particular to be a predetermined allowed control error, in other words in particular a maximum allowed deviation of the steering angle to be controlled.

The railborne driver assistance device includes a second processing unit which is designed to adjust the stationary control accuracy of the steering angle via the output of an accuracy request signal to the first processing unit in such a way that there is a scaling of the control accuracy between a lower and an upper threshold value. Consequently, the control accuracy is in particular varied by the second processing unit with the aid of an interface signal to the first processing unit. In other words, there is preferably an adaptive manipulation of the stationary control accuracy. The second processing unit is in particular a control unit of the railborne driver assistance device. In particular, the second processing unit, which determines the lateral guidance, represents a control that is superposed on the first processing unit. The accuracy request signal is preferably digital.

The second processing unit has a control unit having an integrator including at least or precisely one input and one output each, wherein the output of the integrator is connected to the input in a closed-loop manner with a weighting that is dependent on the accuracy request signal. The weighting can be, for example, a gain factor which can be added or multiplied. In other words, the feedback from the integrator output can in particular be weighted by way of the accuracy request signal. The consequence of this is that the charging of the integrator can be influenced and, thus, the control accuracy can also be altered. The essential advantage resulting from this is that the control accuracy can be limited and, at the same time, there is no further charging of the integrator.

The upper threshold value particularly preferably leaves the stationary control accuracy of the electrically supported steering system unchanged. Furthermore, it is preferred that the lower threshold value implements a maximum predetermined attenuation of the stationary control accuracy. Accordingly, there are two extreme values in particular. Consequently, the accuracy request signal is preferably specified between the upper and lower threshold value by the second processing unit. Thus, the steering angle control, implemented by the first processing unit, is in particular extended to include the function of the attenuation of the control accuracy of the steering angle to be controlled.

A stationary control error particularly preferably approaches zero at the upper threshold value. At zero, the stationary control accuracy remains unchanged. Furthermore, it is preferred that the maximum permissible control error is present at the lower threshold value. A permanent control error is preferably permissible for intermediate variables between the upper and lower threshold value. In this way, the maximum control accuracy can, e.g., be continually attenuated.

For example, the second processing unit is designed to adjust the control accuracy of the steering angle by means of a temporal cross-fading. In this way, discontinuities in the actuating variable can advantageously be reduced. Discontinuities can arise, for example, if there is a sudden switchover between states. The temporal cross-fading can be implemented, e.g., by linear ramping up.

According to a preferred further development, the accuracy request signal is designed quasi-continuously in order to generate the temporal cross-fading. Furthermore, the second processing apparatus is preferably designed to interpolate or to cross-fade between the upper and the lower threshold value.

The first processing unit preferably comprises a controller having a disturbance variable feedforward, wherein a proportional feedforward of the disturbance variable to the actuating torque is executed in accordance with a weighting that is dependent on the accuracy request signal. The weighting can be, for example, a gain factor which can be added or multiplied.

According to a preferred embodiment, the degree of attenuation of the control accuracy to be adjusted is established by means of a two-stage or multi-stage cascade control unit. In other words, the degree of attenuation, consequently in particular the realization of higher or lower control accuracy, can preferably be implemented by the additional use of a second, third or further controller with different parameterizations and/or different controller structures, between which the second processing unit is designed to switch over, to cross-fade and/or to interpolate.

According to a further preferred embodiment, the first processing unit comprises a steering angle control unit for establishing the steering angle with the stationary control accuracy as well as a feedforward control unit for the feedforward control of the steering angle, wherein a contribution of the feedforward control unit is scaled as specified by the accuracy request signal prior to the proportional feedforward to the actuating torque. In particular, the feedforward control is scaled irrespective of the scaling of the stationary control accuracy, e.g., by a separate accuracy signal.

It is preferable that the stationary control accuracy has a predetermined output value as the basic setting until it is adjusted by the second processing unit.

The stationary control accuracy is preferably adjusted depending on the situation, especially as a function of a lateral driving maneuver to be performed or performed by the vehicle.

For example, when wheel fight occurs, the control accuracy is attenuated adaptively or to a previously established extent, consequently reduced, in particular by the second processing device.

Alternatively or optionally in addition, the control accuracy is adaptively attenuated or attenuated to a previously established extent, in particular by the second processing device, when a driver intervention is detected.

The control accuracy is particularly preferably established by the second processing device during a dynamic driving maneuver to be performed or performed, when entering a curve and/or exiting a curve with in particular an accuracy request signal of at least 70 percent, especially 100 percent. The dynamic driving maneuver is, for example, a double lane change or an evasive maneuver (emergency evasion). Consequently, it is in particular ensured that a precise steering operation is implemented in safety-critical traffic scenarios. The dynamic driving maneuver can, for example, be ascertained by evaluating a turn signal, an abrupt driver intervention or driving behavior, by evaluating the external environment such as, e.g., the imminent tail end of a traffic jam.

According to a further preferred exemplary embodiment, a stronger or weaker recommended torque is obtained by means of the accuracy specification when the driver steers, depending on an established driving mode and/or as a function of driver-specific driving behavior. A driving mode is, for example, an adjustable sporty, comfortable or ECO driving mode. In this context, driver-specific driving behavior is to be understood in particular as the type of driver who, for example, prefers a sporty, comfortable, predictive or slow driving style. In other words, the second processing unit is designed to increase the control accuracy as the driving behavior or driving mode becomes increasingly sporty. Purely by way of example, provision can be made to provide a control accuracy with an accuracy request signal of at least 70 percent when the sport mode is adjusted, since more direct steering behavior does not usually seem unpleasant to the sporty type of driver.

The driver assistance device can in particular comprise a microcontroller or microprocessor, a central processing unit (CPU), a graphics processing unit (GPU), a digital signal processor (DSP), an ASIC (Application Specific Integrated Circuit), an FPGA (Field Programmable Gate Array) and more of the same as well as software for performing the corresponding steps of the method.

The present disclosure can consequently be implemented in digital electronic circuits, computer hardware, firmware or software.

A further subject-matter of the disclosure relates to a vehicle having a railborne driver assistance device according to the preceding description.

A further subject-matter of the disclosure relates to a method for supporting or automating the lateral control of the vehicle with a railborne driver assistance device according to the preceding description. A steering torque intervention is controlled by establishing a steering angle with a stationary control accuracy of an electrically supported steering system, wherein the stationary control accuracy of the steering angle is adjusted via the output of an accuracy request signal in such a way that there is a scaling of the control accuracy between a lower and an upper threshold value.

A further subject-matter of the disclosure relates to a computer program product for supporting or automating the lateral control of the vehicle with a railborne driver assistance device, wherein the computer program product comprises instructions which, when run on a control unit or a computer of the vehicle, executes the method of the preceding description.

BRIEF DESCRIPTION OF THE DRAWINGS

Further features, advantages and effects are set out in the following description of exemplary embodiments, wherein.

DETAILED DESCRIPTION

Figure 1:
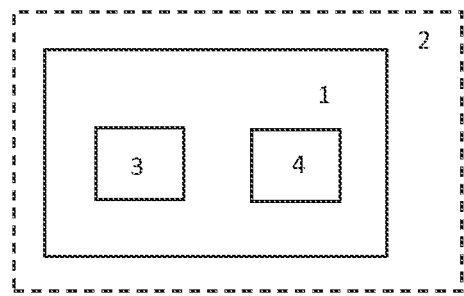
FIG. 1 shows a schematic representation of a railborne driver assistance device having a first and second processing unit.

FIG. 1 shows a schematic representation of a railborne driver assistance device 1 for a vehicle 2. The driver assistance device 1 includes a first processing unit 3 which is designed to control a steering torque intervention by establishing a steering angle with a stationary control accuracy of an electrically supported steering system. For example, the first processing unit 3 is a control unit of an electric power steering EPS for controlling steering torque interventions.

The driver assistance device 1 includes a second processing unit 4 which is designed to adjust the stationary control accuracy of the steering angle via the output of an accuracy request signal to the first processing unit 3 in such a way that there is a scaling of the control accuracy between a lower and an upper threshold value.

Figure 2:
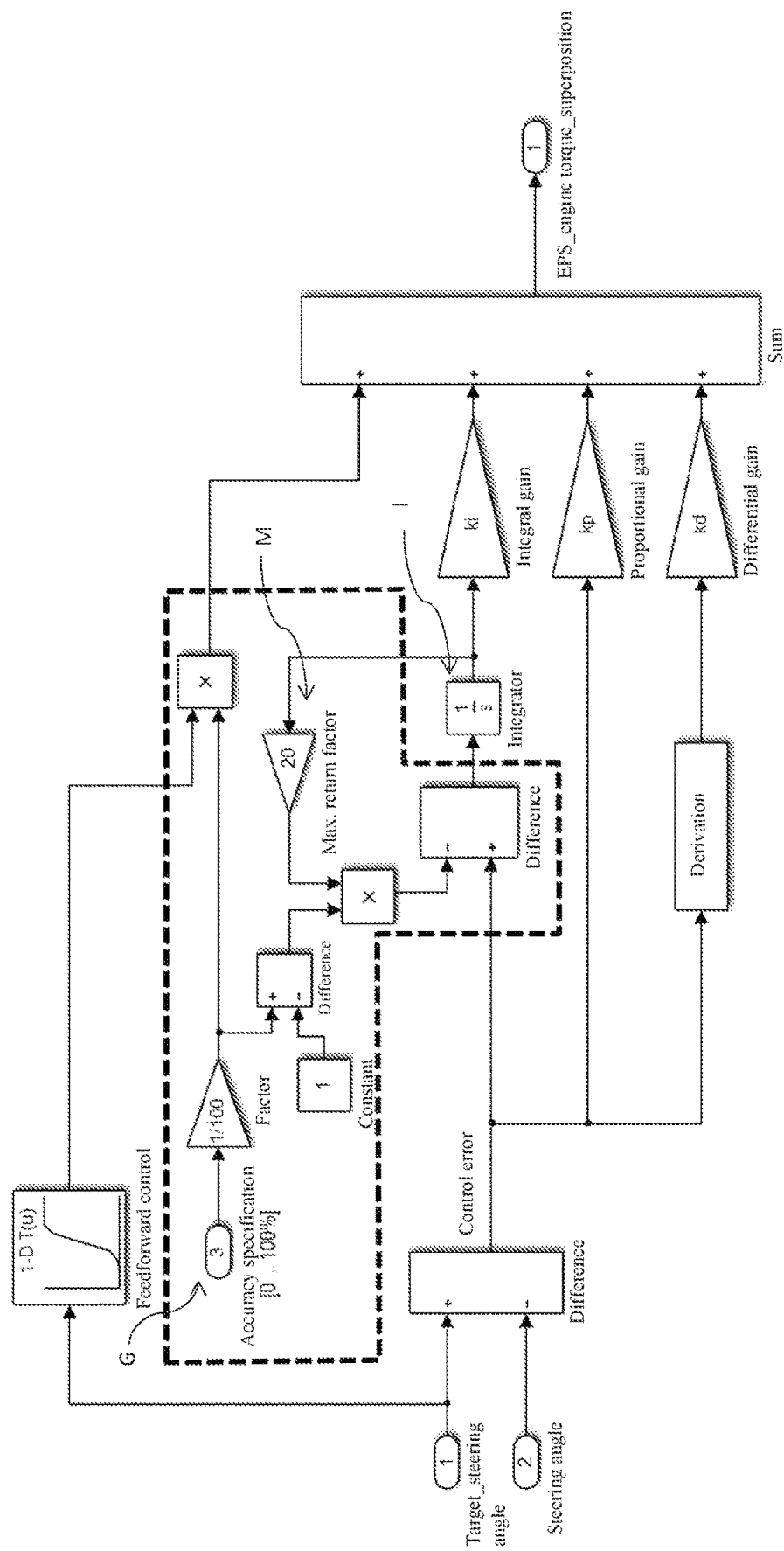
FIG. 2 shows an exemplary implementation of the railborne driver assistance device from FIG. 1 when using a traditional PID steering angle controller having a feedforward control.

FIG. 2 shows an exemplary implementation of the railborne driver assistance device 1 from FIG. 1 when using a traditional PID steering angle controller with feedforward control. Purely by way of example, the second processing unit 3 here includes a control unit having an integrator I comprising an input and an output, wherein the output of the integrator I is connected to the input in a closed-loop manner with a weighting dependent on the accuracy request signal G.

An aspect according to the disclosure is that the component of the feedforward control is scaled with the value range [0% . . . 100%] depending on the specification of an externally specified continual accuracy specification G.

A further aspect according to the disclosure is that the integrator output of the controller, likewise scaled by way of the accuracy request signal G, is fed back to the integrator input in the sense of a connection in a closed-loop manner. In the case of an accuracy specification of 100%, the loop gain is 0, in the case of an accuracy specification of 100%, this is a specifiable maximum gain M.

The transfer function of the integrator block having a connection branch in a closed-loop manner is:

$$G(s)=1/(s+\text{Max return factor } M^*(1-\text{Accuracy specification } G/100))$$

It can be seen that, depending on the value of the accuracy specification G, the pure integrator results in a PT1 element with a predefinable steady component gain.

These two measures can, on the one hand, effectively prevent the continuous integration of the integrator I when the driver intervenes. When the driver deflects the steering wheel, if an accuracy request signal G is 0% and a high value is selected for max. return factor M, there is practically only one PD controller present that generates an EPS engine superposition torque of the size EPS_engine torque_superposition=control_error*(s*kd+kp) which corresponds to the system equation of a damped spring, which behavior is comprehensible to the driver.

Without scaling the feedforward control component, an additional, deflection-dependent additional torque would result which, depending on the level of the feedforward control, can be perceived as being implausible for the driver.

By converting the pure integrator I into a PT1 element, limit cycles of the steering angle control variable are prevented at the same time, since the controller is now no longer striving for exact stationary control accuracy, which is the main cause for the stick-slip in connection with the static and dynamic friction of the system. This increases the smoothness of the steering wheel and the driving comfort felt by the driver.

Figure 3:
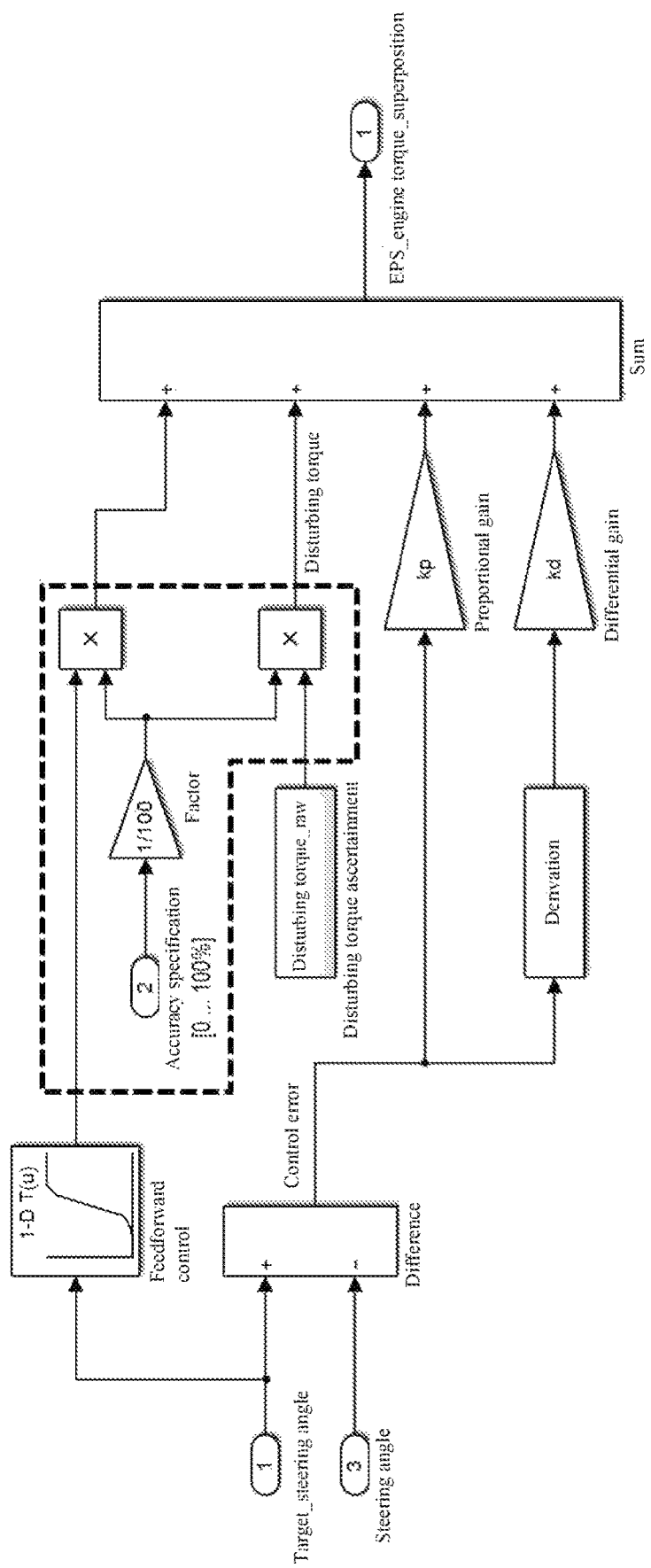
FIG. 3 shows an example of an extension of a PD steering angle controller with disturbance value feedforward to include the path of an accuracy specification.

In the event that the first processing unit 3, in particular a steering angle controller of the first processing unit 3, e.g., on the EPS is not based on a PI(D) approach, the method can nevertheless be implemented in a similar manner, cf. FIG. 3.

FIG. 3 shows, by way of example, an extension of a PD steering angle controller having disturbance variable feedforward control to include the path of the accuracy specification. The first processing unit 3 is shown with a controller having disturbance value feedforward, wherein the proportional feedforward of the disturbance variable to the actuating torque is executed in accordance with a weighting that is dependent on the accuracy request signal.

In the case of a controller approach which is based on a disturbance variable estimation and feedforward, the estimated disturbance variable Disturbance torque_raw is scaled with the accuracy signal prior to the feedforward thereof.

Disturbance torque=Disturbance torque_raw*(Accuracy specification G/100))

Figure 4:
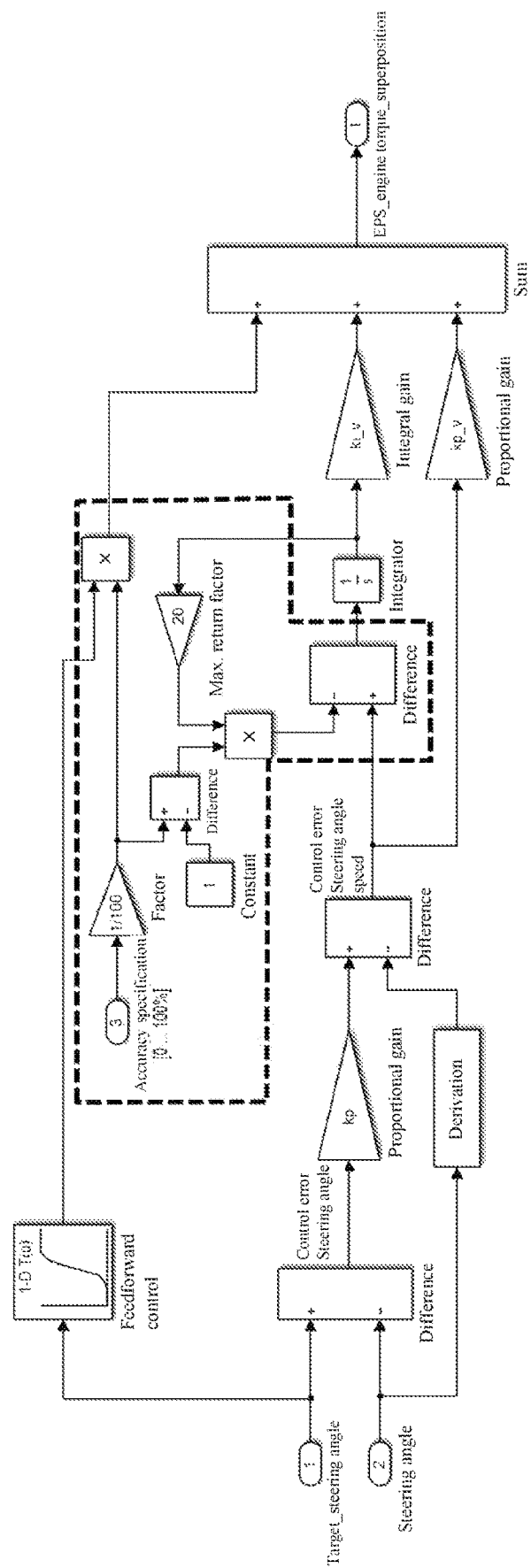
FIG. 4 shows an example of an extension of a P-PI cascade controller to include the accuracy specification path.

FIG. 4 shows, by way of example, an extension of a P-PI cascade controller to include the accuracy specification path. In this exemplary embodiment, the degree of attenuation of the control accuracy to be adjusted is established by means of a multi-stage cascade control unit, consequently multiple controllers having different parameterizations and different controller structures (designs) are implemented, between which the second processing unit 4 is designed to switch over, to cross-fade and/or to interpolate.

The exemplary cascade control comprises a P controller for the steering angle and a PI controller for the steering angle speed, wherein the integrator I of the inner cascade is limited to how it is implemented in the case of the PID controller in FIG. 2.

In the case of state controller or cascade controller approaches having an I component, the integrator I is to correspondingly be connected in a closed-loop manner (cf. exemplary embodiment in FIG. 4).

In general, irrespective of the controller approach, the effect of that path which is responsible for the stationary control accuracy is to be attenuated in a scaled manner.

It should be noted that the two-stage cascade control shown in FIG. 4 is exemplary and not restrictive, so that additional controllers and controller types to a P and a PI controller are also conceivable.

The adaptive controller accuracy interface can be operated when required or always. In this way, the accuracy can be adaptively reduced when wheel fight occurs. The accuracy can also be reduced in order to adjust the steering torque when a driver intervention is recognized. During dynamic driving maneuvers or when entering or exiting curves, a high accuracy of at least 70 percent is preferably selected.

The invention claimed is:

1. A railborne driver assistance device for lateral control of a vehicle, comprising:
    a first processing unit configured to control a steering torque intervention by establishing a steering angle with a stationary control accuracy of an electrically supported steering system, and
    a second processing unit configured to adjust the stationary control accuracy of the steering angle via an output accuracy request signal of the second processing unit to the first processing unit in such a way that there is a scaling of the stationary control accuracy between a lower and an upper threshold value,
    wherein the second processing unit has an integrator comprising an input and an output, wherein the output of the integrator is connected to an input in a closed-loop manner with a weighting dependent on the accuracy request signal.

2. The railborne driver assistance device according to claim 1, wherein the upper threshold value leaves the stationary control accuracy of the electrically supported steering system unchanged and wherein the lower threshold value implements a maximum predetermined attenuation of the stationary control accuracy.

3. The railborne driver assistance device according to claim 1, wherein the accuracy request signal is specified between the upper and lower threshold value, wherein a stationary control error approaches zero at the upper threshold value and wherein the maximum permissible control error is present at the lower threshold value.

4. The railborne driver assistance device according to claim 1, wherein the second processing unit is designed to adjust the stationary control accuracy of the steering angle utilizing temporal cross-fading.

5. The railborne driver assistance device according to claim 4, wherein the accuracy request signal is designed quasi-continuously, wherein the second processing unit is configured to interpolate or to cross-fade between the upper and lower threshold value.

6. The railborne driver assistance device according to claim 1, wherein the weighting dependent on the accuracy request signal is a gain factor.

7. The railborne driver assistance device according to claim 1, wherein the first processing unit comprises a controller having a disturbance variable feedforward, wherein a proportional feedforward of the disturbance variable to an actuating torque is executed in accordance with a weighting that is dependent on the accuracy request signal.

8. The railborne driver assistance device according to claim 1 wherein a degree of attenuation of the stationary control accuracy to be adjusted is established by multi-stage cascade control unit.

9. The railborne driver assistance device according to claim 1, wherein the first processing unit is configured to perform steering angle control for establishing a steering angle with a stationary control accuracy as well as feedforward control of the steering angle, wherein a contribution of the feedforward control is scaled as specified by the accuracy request signal prior to a proportional feedforward to an actuating torque.

10. The railborne driver assistance device according to claim 1, wherein the stationary control accuracy has a predetermined output value until the stationary control accuracy is adjusted by the second processing unit.

11. The railborne driver assistance device according to claim 1, wherein the second processing unit is configured to adaptively attenuate the stationary control accuracy when at least one of wheel fight occurs or a driver intervention is recognized.

12. The railborne driver assistance device according to claim 1, wherein during a dynamic driving maneuver, when at least one of entering and/or exiting a curve, the stationary control accuracy is established with an accuracy request signal of at least 70 per cent.

13. The railborne driver assistance device according to claim 1 wherein a stronger or weaker recommended torque is obtained by an accuracy specification when the driver steers, depending on an established driving mode or as a function of driver-specific driving behavior.

14. A vehicle having a railborne driver assistance device comprising:
    a first processing unit configured to control a steering torque intervention by establishing a steering angle with a stationary control accuracy of an electrically supported steering system, and
    a second processing unit configured to adjust the stationary control accuracy of the steering angle via an output accuracy request signal to the first processing unit in such a way that there is a scaling of the stationary control accuracy between a lower and an upper threshold value,
    wherein the second processing unit has an integrator comprising an input and an output, wherein the output of the integrator is connected to the input in a closed-loop manner with a weighting dependent on the accuracy request signal.

15. A method for lateral control of a vehicle, comprising: controlling a steering torque intervention with a first processing unit by establishing a steering angle with a stationary control accuracy of an electrically supported steering system; and adjusting the stationary control accuracy of the steering angle with a second processing unit via the output of an accuracy request signal to the first processing unit in such a way that there is a scaling of the stationary control accuracy between a lower and an upper threshold value, wherein the second processing unit has a control unit having an integrator comprising an input and an output, wherein the output of the integrator is connected to the input in a closed-loop manner with a weighting dependent on the accuracy request signal.

\* \* \* \* \*